United States Patent [19]
Betz et al.

[11] 4,311,713
[45] * Jan. 19, 1982

[54] FEED INTAKE LIMITING ACIDULATED FAT FOR ANIMALS

[75] Inventors: Norman L. Betz, St. Louis, Mo.; Kent J. Lanter, Belleville, Ill.; Danny L. Williams, Manchester, Mo.

[73] Assignee: Ralston Purina Company, St. Louis, Mo.

[*] Notice: The portion of the term of this patent subsequent to Nov. 18, 1997, has been disclaimed.

[21] Appl. No.: 204,738

[22] Filed: Nov. 7, 1980

Related U.S. Application Data

[63] Continuation-in-part of Ser. No. 102,213, Dec. 10, 1979, abandoned, which is a continuation of Ser. No. 930,786, Aug. 3, 1978, abandoned, which is a continuation-in-part of Ser. No. 849,721, Nov. 9, 1977, abandoned.

[51] Int. Cl.³ .................................................. A23K 1/00
[52] U.S. Cl. ........................................ 426/2; 426/601; 426/608; 426/635; 426/646; 426/807

[58] Field of Search ................ 426/2, 69, 72, 71, 636, 426/623, 430, 646, 807; 260/412.3, 412.5, 412.7, 424

[56] References Cited

U.S. PATENT DOCUMENTS

| 2,970,910 | 2/1961 | Thurman | 426/807 |
| 3,428,660 | 2/1969 | Morren | 260/412.5 |
| 3,669,676 | 6/1972 | Karretal | 426/74 |
| 4,234,604 | 11/1980 | Betz et al. | 426/2 |

Primary Examiner—William F. Smith
Attorney, Agent, or Firm—Joseph M. Hageman

[57] ABSTRACT

A composition for limiting feed supplement intake for animals is disclosed which comprises an acidulated fat, wherein acidulation of the fat is carried out at a temperature of at least about 220° F. with an acid, preferably a mineral acid. The acidulated fat can be incorporated into the feed supplement at a level exceeding 1.5% by weight to control intake or combined with other intake limiters such as meat meal, diammonium phosphate, and ammonium sulfate for intake control. This composition controls feed supplement intake by the animal when added thereto, permitting self-rationed feeding without waste.

27 Claims, No Drawings

FEED INTAKE LIMITING ACIDULATED FAT FOR ANIMALS

BACKGROUND OF THE INVENTION

This application is a continuation-in-part of our previously filed application U.S. Ser. No. 102,213, filed Dec. 10, 1979, now abandoned, which is a continuation of our previous application Ser. No. 930,786, filed Aug. 3, 1978, now abandoned, which is a continuation-in-part of our previously filed application U.S. Ser. No. 849,721, filed Nov. 9, 1977, now abandoned.

This invention relates to a feed intake limiting composition for animals, either monogastric or ruminants and a process for employing the same in order to attain an economical and efficient means of self-feeding animals.

In the feeding of animals on pasture, particularly cattle, it is often very advantageous from the standpoint of economics, as well as convenience, for the animals to be self-fed, which means that the animals are offered a feed supplement on a free choice basis without periodic feedings of a rationed amount by a farmer or rancher each day. A disadvantage, however, or self-feeding animals such as cattle is that the animals tend to over eat feed supplements and consequently get a higher intake of supplement than is completely necessary for proper weight gain or weight maintenance. This results in an additional expense to the rancher in having to provide additional and unnecessary amounts of protein or feed supplement to be fed in combination with a roughage source such as grass or hay.

It is, therefore, desirable to limit the intake of the protein or feed supplement to an amount which is the proper amount needed for weight gain or weight maintenance without consumption of more than is needed by the animal. The prior art has incorporated salt or gypsum in the protein or feed supplement in order to control consumption of the supplement to a prescribed amount. A disadvantage, however, in employing either one of these compounds to control consumption of the supplement and accordingly provide an effective self-feeding feed composition is that both materials provide little nutritional value and require mixing in large quantities with the supplement in order to reduce consumption thereof. For example, one part of salt to three parts of protein or feed supplement will ordinarily be required to reduce daily consumption in cattle to the desired amount. Another disadvantage of employing these materials is that salt poisoning of the animals may occur if water is not freely available.

U.S. Pat. No. 3,669,676 provides a solution to the above disadvantages by describing a feed intake limiting composition for cattle comprising a mixture of fish oil, ammonium sulfate, diammonium phosphate, and meat meal. This mixture can be added to a feed supplement which can then be offered on a free choice basis to cattle in combination with a roughage source such as grass or hay. The combination of these materials contribute to the nutrient requirements for the feed supplement as well as effectively controlling intake of the supplement to a prescribed amount. While this composition has proven to be extremely desirable and effective as an intake limiter, the availability of certain components of the mixture, as well as a continuing need for other limiters to effectively control intake as well as contribute to the nutritive properties of the feed supplement has necessitated the development of the feed intake limiting composition of the present invention.

SUMMARY OF THE INVENTION

The present invention provides an intake limiting composition which may be added to a feed supplement for animals, either monogastric or ruminants, thereby controlling feed intake and providing a means of feeding without excessive consumption of the supplement. The intake limiting composition of the present invention comprises an acidulated fat, wherein, acidulation of the fat is carried out at a temperature of at least about 220° F. with an acid, preferably a mineral acid. The acidulated fat may be employed either by itself as a feed supplement intake limiter, for animals generally or in the case of ruminants can be combined with at least one other intake limiting ingredient such as meat meal, diammonium phosphate, and ammonium sulfate for feed intake control. If the acidulated fat is used as the only feed supplement ingredient to control feed intake, it is normally employed in the feed supplement at a level effective to limit intake, typically exceeding 1.5% by weight and preferably at a level between about 1.5 and 16% by weight depending on the degree of intake control desired. If in the case of ruminants, it is employed in combination with other intake limiters such as a material selected from the group consisting of meat meal, diammonium phosphate, ammonium sulfate, and combinations thereof, it may be employed in the feed at a level effective to limit intake, typically at least about 1.5% by weight and preferably between about 1.5 and 16% by weight depending on the degree of intake control desired.

Although the acidulated fat, by itself, is entirely satisfactory for controlling the intake of a feed supplement by ruminants or monogastric animals such as rats and poultry, its use in combination with other intake limiters described above may be desirable in certain feeding programs for ruminants because of the widely varying environmental conditions that ruminants may be fed under, as well as because of the fact that the additional limiters also contribute to the nutritive properties of the feed supplement.

An object, therefore, of the present invention is to provide for a composition which consists of components which individually do not detract from the nutrient requirements of the feed supplement intake to a predetermined amount in order to allow the self-feeding of animals.

It is also an object of the present invention to provide a method for limiting feed supplement intake by ruminants by feeding a composition comprising various materials which individually contribute to the nutrient requirements of the animal, while effectively limiting supplement intake.

DESCRIPTION OF THE PREFERRED EMBODIMENTS

In accordance with the present invention, a composition has been developed which is capable of limiting feed supplement consumption or intake to the amount that is necessary for proper weight maintenance of the animal. This level of feed supplement intake will accordingly vary depending on the species of animals, as well as the environmental conditions under which they are maintained, and the exact level of intake is not intended to limit the present invention although it may be generally considered in the case of cattle that a preferred intake for a feed supplement will be less than 4 lbs. of supplement per head of cattle per day and most preferably about 2 to 4 lbs. of supplement per head of cattle per day. The amount of intake will generally be the amount of intake which is necessary for proper weight maintenance as well as the most efficient feed utilization by the animal.

The intake limiting composition of the present invention comprises an acidulated fat wherein acidulation of the fat is carried out at a temperature of at least about 220° F. with an acid. The acidulated fat may be employed by itself as a feed supplement intake limiter provided that it is employed in the feed supplement at a level effective to limit intake preferably exceeding 1.5% by weight and typically at a level of between 1.5% and 16% by weight, depending on the degree of intake control desired. In the case of ruminants, the acidulated fat can also be used in combination with other intake limiting ingredients selected from the group consisting of meat meal, diammonium phosphate, ammonium sulfate, and combinations of these ingredients if desired.

The acidulated fat which is employed in the present invention, either as the sole intake limiting material of the feed supplement or in combination with other intake limiting ingredients, is obtained by the acidulation of an unsaponified fat with an acid at an elevated temperature. The particular type of unsaponified fat or oil is not critical to the present invention and various types of unsaponified animal or vegetable fats or oils have been determined to be suitable as the starting material for producing the acidulated fat of the present invention. For example, unsaponified fats in their natural state are typically low in free fatty acid content and among those which are suitable are those selected from the group consisting of coconut oil, corn oil, cottonseed oil, palm oil, palm kernel oil, soybean oil, tallow and grease.

The unsaponified animal or vegetable fat employed as the starting material in the present invention is combined with an acid preferably a mineral acid, such as hydrochloric acid, phosphoric acid, or sulfuric acid and the mixture is heated to a temperature of at least about 220° F. and preferably to around 260° F. or higher. The mixture should not be heated to a temperature sufficient to degrade or burn the oil to such a degree that its usefulness as an intake limiter is destroyed. Therefore, while all temperatures in the above ranges are suitable, it is also desirable if sulfuric acid is employed to use less concentrated forms of sulfuric acid or employ temperatures in the lower end of the operative range if sulfuric acid is used in concentrated form. The level of mineral acid which may be employed in acidulating the selected fat of the present invention is not critical, since typically a preferred mineral acid such as hydrochloric will volatilize at temperatures below or very near those temperatures employed in the present invention for acidulation of the fat. Therefore, removal of substantially all of an acid such as hydrochloric can be carried out during acidulation of the fat thereby making the exact amount employed non-critical insofar as achieving the acidulation needed for intake limitation. Typical levels of acid which may be employed in acidulating the fat is at least about 1% or preferably between about 4 and 10% by weight and most preferably between 8 and 10% by weight of the fat. If so desired, one can use levels of acids of 1% and below if sealed apparatus is used for fat acidulation which provides for reflux of the fat and acid wherein condensation of the acid vapors and recycling of the acid to the reflux vessel takes place.

It has been determined that the temperature of acidulation is the most critical factor in imparting intake limiting properties to a fat acidulated under the conditions of the present invention. In this regard, a minimum temperature of about 220° F. is considered to be the minimum temperature necessary for acidulation of a fat with an acid to provide intake limiting properties upon addition to a feed supplement whether the acidulated fat is used by itself or together with other intake limiting compounds. It is also preferred for purposes of the present invention that the fat be acidulated with the mineral acid at a temperature of about 260° F. Although an upper limit insofar as temperature is not necessarily a critical factor in obtaining an intake limiting material pursuant to the present invention, nevertheless, it will be understood that the temperature should not be so high so as to char, burn, or otherwise destroy the fat. After achieving the minimum temperature required for acidulation of the fat, the acid and fat mixture is preferably held at this temperature for a period of time. This time period is usually at least about 30 minutes, with a preferred time for acidulation of 180 minutes in an unsealed reaction vessel and 60 minutes in a sealed reaction vessel. It is not critical relative to intake limiting properties of the acidulated fat of the present invention how long the fat is held at this elevated temperature or how quickly the acid and fat mixture achieve the minimum acidulation temperature since this will be entirely dependent upon the quantity of fat and acid employed as well as the specific temperature employed for acidulation. Typically, however, for purposes of commercial practice, the mixture will be heated to the required minimum temperature for acidulation as quickly as possible.

It is also preferred, although not critical to the practice of the present invention that prior to the addition of the acidulated fat to the feed supplement, the pH be adjusted to within the range of 4.0 to 7.0 for ease of handling. This avoids handling problems with an otherwise very acidic material without adversely affecting intake limiting properties of the fat.

If the acidulated fat is added to the feed supplement for intake limitation either with or without other intake limiting material, it should be employed in the feed supplement at a level effective to limit intake preferably exceeding 1.5% by weight of the supplement and typically at a level of between 1.5% and 16% by weight.

If the acidulated fat is employed with other intake limiters, such as ammonium sulfate, as can optionally be the case with ruminants, the feed intake limiting composition will contain between about 0.1-5% by weight of ammonium sulfate, although preferably the amount of ammonium sulfate may be varied between 1 and 4% to achieve a preferred level of intake limitation when used in combination with the preferred amounts of other ingredients of the intake limiting composition. The type of ammonium sulfate which may be employed in the present invention is not critical to its practice and it may be of generally any type considered suitable for feed use.

The feed intake limiting composition of the present invention may also contain sufficient diammonium phosphate, as can optionally be the case with ruminants, so that the feed supplement to which the composition is added will contain between about 0.1-5% by weight of diammonium phosphate. The preferred amount of diammonium phosphate which may be added is between about 2 and 5% by weight in order to achieve the preferred level of intake limitation when used in combination with preferred amounts of other ingredients of the intake limiting composition. Likewise, the present invention is not limited by the type or purity of diammonium phosphate which may be employed and in any source of this material normally considered suitable for feed use may be used in the present invention. The intake limiting composition of the present invention may also contain, as can optionally be the case with ruminants, an ingredient such as meat meal, or an equivalent, dry ground meat scraps or meat by-products in such an amount that the feed supplement to which this composition is added will contain between about 0.1 to 20% by weight of meat meal. Preferably, the amount of meat meal may be varied between 3 and 17% by weight of the feed supplement to also achieve the preferred level of intake limitation when used in combination with preferred amounts of other ingredients of the intake limiting composition.

The feed intake limiting composition of the present invention may be added to the feed supplement or in the event more than one intake limiter is used, the individual components of the noted composition may be separately mixed and combined or mixed individually with the feed supplement. Furthermore, the feed supplement to which the intake limiting compositions of the present invention are added may be any feed material generally intended to provide the full nutritional requirements of the animal with the exception of, in the case of ruminants, the roughage sources which are considered to be necessary for proper nutrition. Therefore, the feed supplement to which the intake limiting compositions of the present invention may be added will consist of the various grains which can be categorized as predominantly farinaceous or proteinaceous grains as the case may be. Included among those suitable proteinaceous materials are the vegetable protein materials such as soybean, cottonseed or peanuts. These materials are considered to be highly utilizable sources of protein for animals. Likewise, various farinaceous materials which contain a lower percentage of protein may also be employed since these additionally contribute to the protein requirement of the feed supplement and among those materials which are suitable are grains such as corn, milo, alfalfa, or various wheat materials or wheat by-products. If desired, the feed supplement may additionally contain various non-protein nitrogen sources which ruminant animals specifically utilize to convert to organic protein. The addition of this type of material provides a cheap and effective source of nitrogen in a ruminant diet.

The feed supplement will also typically contain various minerals which are considered to be essential for animals such as ruminants, poultry or monogastric species in general, as well as various vitamins, either fat or water soluble, which typically are added to feed supplements for a complete nutritional balance.

A further ingredient which may be employed in the present invention are various medicaments which may be added to the feed supplement either for the purpose of disease control or for improving performance. Materials of this type include additives such as antimycotics, bacteriostats, hormones and the like.

For the most effective results, the feed supplement will be fed in the case of ruminants, in combination with various cellulosic roughage sources such as grass, hay, or silage and the present invention is not intended to be limited insofar as any specific roughage sources to be used in combination with the feed supplement containing the intake limiting compositions of the present invention. It should be recognized that the particular roughage source which may be utilized in the present invention will be generally dictated by the local availability of various forage crops. The protein or feed supplement containing the intake limiting composition of the present invention may be fed in any manner or form considered to be suitable for feeding animals. For example, in the case of cattle, the feed supplement containing the intake limiting composition may be fed in meal or mash form or may be shaped into pellets or cubes or may be compressed into large blocks and offered to cattle grazing on a pasture or a range. It is preferred, however, to feed or administer the supplement containing the intake limiting composition in meal or mash form in such a manner that the cattle have free and ready access to it. It is believe, although this is not intended to be a controlling or limiting factor in the present invention, that the intake limiting properties of the present composition is more effective when fed in a meal form as opposed to a pellet or cube form.

For the purposes of a full and complete disclosure, the following Examples are set forth as illustrative rather than limiting embodiments of the present invention.

EXAMPLE 1

An acidulated fat was prepared by taking 2,000 lbs. of bleachable fancy tallow and adding 10% by weight of concentrated hydrochloric acid (36% HCL). This mixture has heated for 120 minutes until a temperature of 260° F. was achieved at which point the mixture was held at this temperature for a period of 3 hours. The acidulated fat was then neutralized to a pH of 5.0 with sodium hydroxide and added to three separate supplements at varying levels. Each feed supplement was separately identified as "A", "B", and "C" and had the following formulas.

| Supplement | INGREDIENTS (% by Weight) | | | | | | | | | |
|---|---|---|---|---|---|---|---|---|---|---|
| | Cracked Milo | Dehydrated Alfalfa | Wheat Midds | Dicalcium Phosphate | Calcium Carbonate | Salt | Soybean Meal (44%) | Urea | Acidulated Fat | Vitamins & Minerals |
| A | 64.38 | 5.00 | 1.00 | 5.10 | 1.40 | 5.00 | 10.70 | 2.90 | 4.0 | 0.52 |
| B | 65.38 | 5.00 | 1.00 | 5.10 | 1.40 | 5.00 | 10.70 | 2.90 | 3.0 | 0.52 |
| C | 66.38 | 5.00 | 1.00 | 5.10 | 1.40 | 5.00 | 10.70 | 2.90 | 2.0 | 0.52 |

Each of the above feed supplements were fed with a native grass hay to a total of 50 cows for approximately 5 months and the average consumption of the supplement by the cows measured over this period.

| Supplement | Consumption | (lb. per head of cattle per day) |
|---|---|---|
| A | 1.28 | |
| B | 2.06 | |
| C | 5.22 | |

EXAMPLE 2

The acidulated fat produced pursuant to Example 1 was combined with meat meal, ammonium sulfate, and diammonium phosphate to form an intake limiting composition which was added to a feed supplement having the following formula, including the indicated amounts of intake limiters. This feed supplement in meal form was offered to 50 cows over an approximate 5 month period on a free choice basis, and consumption of the ration was measured for the noted period. The formula of the feed supplement was as follows:

| Ingredient | Percent by Weight |
| --- | --- |
| Cracked Milo | 65.68 |
| Dehydrated Alfalfa | 5.00 |
| Wheat Midds | 1.00 |
| Dicalcium Phosphate | 0.30 |
| Calcium Carbonate | 1.10 |
| Salt | 5.00 |
| Meat Meal | 12.00 |
| Ammonium Sulfate | 2.00 |
| Urea | 1.00 |
| Acidulated Fat | 4.00 |
| Diammonium Phosphate | 2.40 |
| Vitamins, Minerals & Antioxidant | 0.52 |

Consumption of the above identified feed supplement was measured and determined to be 1.33 lbs. of supplement per head of cattle per day.

EXAMPLE 3

14 lbs. of acidulated animal fat was produced under identical conditions to that employed in Example 1 with the exception that heating was carried out only for 30 minutes and 8% by weight of this animal fat was added to a feed supplement having the following formula and fed in meal form with a native grass hay to a total of 5 cows for a period of 5 days on a free choice basis. Consumption was measured for the noted period. The formula of the feed supplement was as follows:

| Ingredient | Percent by Weight |
| --- | --- |
| Cracked Milo | 52.82 |
| Dehydrated Alfalfa | 5.00 |
| Wheat Midds | 10.00 |
| Dicalcium Phosphate | 2.40 |
| Salt | 5.00 |
| Soybean Meal (44% Protein) | 13.62 |
| Urea | 2.86 |
| Acidulated Fat | 8.00 |
| Vitamins, Minerals & Antioxidant | 0.30 |

Consumption of the above identified feed supplement was measured and determined to be 1.1 lbs. of supplement per head of cattle per day.

EXAMPLE 4

Acidulated animal fat was produced by taking 15 lbs. of bleachable fancy tallow and adding thereto 10% by weight of concentrated hydrochloric acid (36% HCL) followed by heating of this mixture to a temperature of 220° F. at which point it was held at this temperature for a period of 3 hours. The acidulated fat was added to a feed supplement having the following formula in an amount of 8% by weight. The feed supplement containing the acidulated fat was fed in meal form with a native grass hay to a total of 6 cows for a period of 5 days and consumption of the feed supplement measured for the noted period.

| Ingredient | Percent by Weight |
| --- | --- |
| Cracked Milo | 52.63 |
| Dehydrated Alfalfa | 5.43 |
| Wheat Midds | 10.00 |
| Dicalcium Phosphate | 2.40 |
| Salt | 5.00 |
| Soybean Meal (44% Protein) | 13.59 |
| Urea | 2.80 |
| Acidulated Fat | 8.00 |
| Vitamins, Minerals & Antioxidant | 0.15 |

Consumption of the above identified feed supplement was measured and determined to be equal to 1.9 lbs. of supplement per head of cattle per day.

EXAMPLE 5

An acidulated fat was prepared by taking 45 lbs. of bleachable fancy tallow and adding 0.5% by weight of concentrated sulfuric acid (98% $H_2SO_4$). This mixture was heated 30 minutes until a temperature of 260° F. was achieved at which point the mixture was held at this temperature for a period of 3 hours. The acidulated fat was then combined with a feed supplement which also contained meat meal, ammonium sulfate, and diammonium phosphate according to the following formula. This feed supplement was fed in meal form with a native grass hay to a total of 18 cows for a period of 5 days and consumption of the feed supplement was measured for the noted period. The formula of the feed supplement was as follows:

| Ingredient | Percent by Weight |
| --- | --- |
| Cracked Milo | 56.05 |
| Dehydrated Alfalfa | 5.00 |
| Wheat Midds | 10.00 |
| Dicalcium Phosphate | 2.40 |
| Salt | 5.00 |
| Meat Meal | 12.00 |
| Ammonium Sulfate | 2.00 |
| Urea | 1.00 |
| Acidulated Fat | 4.00 |
| Diammonium Phosphate | 2.40 |
| Vitamins, Minerals & Antioxidant | 0.15 |

Consumption of the above identified feed supplement was measured and determined to be 2.6 lbs. of supplement per head of cattle per day.

EXAMPLE 6

An acidulated fat was prepared by taking 40 lbs. of bleachable fancy tallow and adding 10% by weight of concentrated phosphoric acid (75% $H_3PO_4$). This mixture was heated for 30 minutes until a temperature of 260° F. was achieved at which point the mixture was held at this temperture for a period of 3 hours. The acidulated fat was then combined with a feed supplement which also contained meat meal, ammonium sulfate, and diammonium phosphate according to the following formula. This feed supplement was offered in meal form with a native grass hay to 18 cows during a 5 day period on a free choice basis and consumption of the ration was measured for the noted period. The formula of the feed supplement was as follows:

| Ingredient | Percent by Weight |
| --- | --- |
| Cracked Milo | 52.05 |
| Dehydrated Alfalfa | 5.00 |
| Wheat Midds | 10.00 |
| Dicalcium Phosphate | 2.40 |
| Salt | 5.00 |
| Meat Meal | 12.00 |
| Ammonium Sulfate | 2.00 |
| Urea | 1.00 |
| Acidulated Fat | 8.00 |
| Diammonium Phosphate | 2.40 |
| Vitamins, Minerals & Antioxidant | 0.15 |

Consumption of the above identified feed supplement was measured and determined to be 3.0 lbs. of supplement per head of cattle per day.

EXAMPLE 7

An acidulated fat was prepared by taking 14 lbs. of palm oil and adding 10% by weight of concentrated hydrochloric acid (36% HCL). This mixture was heated for 40 minutes until a temperature of 260° F. was achieved at which point the mixture was held at this temperature for a period of 3 hours. The acidulated fat was combined with a feed supplement which also contained meat meal, ammonium sulfate, and diammonium phosphate according to the formula set forth in Example 6. This feed supplement was offered in meal form with a native grass hay to a total of 5 cows over a 5 day period on a free choice basis, and consumption of the ration was measured for the noted period.

Consumption of the above identified feed supplement was measured and determined to be 0.6 lbs. of supplement per head of cattle per day.

EXAMPLE 8

An acidulated fat was prepared by taking 20 lbs. of corn oil and adding 10% by weight of concentrated hydrochloric acid (36% HCL). This mixture was heated for 30 minutes until a temperature of 260° F. was achieved at which point the mixture was held at this temperature for a period of 3 hours. The acidulated fat was combined with a feed supplement which also contained meat meal, ammonium sulfate, and diammonium phosphate having an identical formula to that of the supplement described in Example 7 with the exception that the acidulated fat produced from corn oil as set forth above, was substituted for the acidulated fat employed in that Example.

This feed supplement was offered in meal form with a native grass hay to a total of 9 cows over a 5 day period on a free choice basis and consumption of the ration was measured and determined to be equal to 1.3 lbs. of supplement per head of cattle per day.

EXAMPLE 9

An acidulated fat was prepared by taking 15 lbs. of cottonseed oil and adding 10% by weight of concentrated hydrochloric acid (36% HCL). This mixture was heated for 30 minutes until a temperature of 260° F. was achieved at which point the mixture was held at this temperature for a period of 3 hours. The acidulated fat was combined with a feed supplement which also contained meat meal, ammonium sulfate, and diammonium phosphate having an identical formula to the supplement described in Example 7 including the indicated amounts of intake limiters with the exception that the acidulated fat that was employed is derived from the cottonseed oil as processed above.

This feed supplement was fed in meal form with a native grass hay to a total of 7 cows for a period of 5 days on a free choice basis and consumption of the feed was determined to be equal to 0.9 lbs. of supplement per head of cattle per day.

EXAMPLE 10

An acidulated fat was prepared by taking 15 lbs. of bleachable fancy tallow and adding 10% by weight of hydrochloric acid (36% HCL). This mixture was heated for 30 minutes until a temperature of 260° F. was achieved at which point the mixture was immediately cooled. This was combined with a feed supplement which also contained meat meal, ammonium sulfate, and diammonium phosphate having an identical formula to the supplement described in Example 7 including the indicated amounts of intake limiters with the exception that the acidulated fat employed is produced according to the present example. This feed supplement was fed in meal form with a native grass hay to a total of 5 cows for a period of 5 days and consumption of the feed was determined to be equal to 1.1 lbs. of supplement per head of cattle per day.

EXAMPLE 11

An acidulated fat was prepared by taking 40 lbs. of yellow grease and adding 10% by weight of concentrated hydrochloric acid (36% HCL). This mixture was heated for 30 minutes until a temperature of 260° F. was achieved at which point the mixture was held at this temperature for a period of 3 hours. The acidulated fat was combined with a feed supplement which also contained meat meal, ammonium sulfate, and diammonium phosphate having an identical formula to the supplement described in Example 8 including the indicated amounts of intake limiters with the exception that the acidulated fat of the present example was employed. This supplement was fed in meal form with a native grass hay to a total of 18 cows for a period of 5 days on a free choice basis and consumption of the feed was determined to be equal to 1.7 lbs. of supplement per head of cattle per day.

EXAMPLE 12

To illustrate the importance of temperature relative to intake limitation by an acidulated fat of the present invention a number of batches of acidulated fat were prepared by taking 20 lbs. of bleachable fancy tallow and adding 10% by weight of concentrated hydrochloric acid (36% HCL). These batches of fat were all heated for 30 minutes until the desired temperature was achieved followed by holding of the fat at the indicated temperature for a period of 3 hours. Each batch of acidulated fat, which was acidulated at a different temperature, was then added to a separate feed supplement having the following general formula:

| Ingredients | Percent by Weight |
| --- | --- |
| Cracked Milo | 56.63 |
| Dehydrated Alfalfa | 5.43 |
| Wheat Midds | 10.00 |
| Salt | 5.00 |
| Dicalcium Phosphate | 2.40 |
| Soybean Meal (44% Protein) | 13.59 |
| Urea | 2.80 |
| Acidulated Fat | 4.00 |

| Ingredients | Percent by Weight |
|---|---|
| Vitamins, Minerals & Antioxidant | 0.15 |

Each feed supplement in meal form containing each different batch of acidulated fat was fed with a native grass hay to the indicated number of cows for the indicated period of time in two separate feeding trials and consumption measured in terms of pounds of supplement per head of cattle per day. Also fed was an additional control supplement with a native grass hay having the above formula wherein the bleachable fancy tallow had not been acidulated.

| Feeding Trial No. 1 | | | | |
|---|---|---|---|---|
| Supplement | Temperature of Acidulation (°F.) | No. of Cows | No. of Days | Consumption |
| 1 | 170 | 9 | 3 | 8.1 |
| 2 | 190 | 9 | 3 | 9.1 |
| 3 | 210 | 9 | 3 | 8.0 |
| 4 | 230 | 9 | 5 | 4.7 |

| Feeding Trial No. 2 | | | | |
|---|---|---|---|---|
| Supplement | Temperature of Acidulation (°F.) | No. of Cows | No. of Days | Consumption |
| 5 | 210 | 8 | 5 | 7.2 |
| 6 | 220 | 9 | 5 | 6.1 |
| 7 | 230 | 10 | 3 | 5.9 |
| Control | Fat Not Acidulated | 9 | 3 | 10.0 |

EXAMPLE 13

A quantity of the acidulated fat generally produced in accordance with Example 1 was added to a feed supplement in an amount of 4% by weight. The formula of the feed supplement was as follows:

| Ingredients | Percent by Weight |
|---|---|
| Casein | 21.64 |
| Corn Oil | 6.0 |
| Corn Starch | 30.0 |
| Cerelose | 24.86 |
| Deionized Water | 5.0 |
| Cellulose | 3.0 |
| Vitamins & Minerals | 5.50 |
| Acidulated Fat | 4.0 |

The feed supplement was fed to a group of 70 full grown adult male rats, 100 days old for a period of 7 days. Feeding of the above supplement containing the acidulated fat was preceded by a feeding for 7 days of a control supplement having an identical formula to that set forth above but with 4% corn oil in place of the acidulated fat. Following the seven day text period the rats were fed the control diet for an additional 7 days. Average feed consumption (gm) for groups of 10 rats was measured as follows:

| | 1 | 2 | 3 |
|---|---|---|---|
| Feeding Period | (7 days) | (7 days) | (7 days) |
| Control Diet | 185 | | 198 |
| Test Diet | | 97 | |

It may be seen that when the test diet containing the acidulated fat was introduced to the rats during the second feeding period feed intake was significantly reduced. The reintroduction of the control diet during the third period returned feed intake to a normal level. It may be therefore seen that the present intake limiting composition is highly effective in limiting the intake of monogastric animals such as rats.

EXAMPLE 14

A quantity of the acidulated fat generally produced in accordance with Example 1 was added to a feed supplement in an amount of 4% by weight. The formula of the feed supplement was as follows:

| Ingredient | Percent by Weight |
|---|---|
| Ground Corn | 51.4 |
| Feather Meal | 0.5 |
| Dehydrated Alfalfa | 2.0 |
| Brewers Grains | 5.0 |
| Wheat Midds | 5.0 |
| Dehulled Soybean Meal | 17.3 |
| Calcium Carbonate | 9.2 |
| Dicalcium Phosphate | 1.4 |
| Acidulated Fat | 4.0 |
| Minerals and Vitamins | 4.2 |

The above supplement was fed to 47 week old roosters to determine the ability of the acidulated fat to limit intake of the feed. This was compared against a control diet which contained 4% animal fat in place of the acidulated fat. All roosters were fed a commonly used feed supplement for 14 days prior to feeding of the test and control diets to ascertain normal feed consumption by the individual roosters, this averaged about 2.85 lbs per bird for the 14 day period. These roosters were then allotted into groups of six, based upon their individual consumption for the 14 day pre-test period to achieve an approximately equal average consumption for each group. Then the control ration and the ration containing the acidulated fat was fed for the following 14 days. The results are set forth below, which show the average weight of feed consumed by each bird for the 14 day period.

| | 14 Day Test Period Average Feed Consumption per Bird (lb) |
|---|---|
| Control Ration | 2.78 |
| Test Ration (4% acidulated fat) | 2.13 |

It may be seen that the experimental ration containing the acidulated fat significantly lowered consumption from the average pre-test consumption of 2.85 lbs as compared to the control diet which only slightly reduced feed intake below pre-test consumption.

The above Examples are merely illustrative of the instant invention and it will be understood that various other changes in the details, materials, or steps which have been described may be made without departing from the spirit of the instant disclosure, and such changes and other modifications are intended to be included within the scope of the instant disclosure and appended claims.

What is claimed is:

1. A feed supplement for animals containing an intake limiting composition, said feed supplement comprising grain, said intake limiting composition being present in an amount effective to limit intake of said supplement consisting essentially of an acidulated unsaponified fat selected from the group consisting of coconut oil, corn oil, cottonseed oil, palm oil, palm kernel oil, soybean oil, tallow, and grease which has been acidulated at a temperature of at least about 220° F. with an acid.

2. The feed supplement of claim 1 wherein acidulation is carried out at said temperature for a period of time sufficient to volatilize a major portion of said acid.

3. The feed supplement of claim 2 wherein acidulation is carried out at said temperature for between 30–180 minutes.

4. The feed supplement of claim 1 wherein the amount of said acidulated fat effective to limit intake is at least about 1.5% by weight of said supplement.

5. The feed supplement of claim 1 wherein the amount of said acidulated fat effective to limit intake is between about 1.5% and 16% by weight of said supplement.

6. The feed supplement of claim 1 wherein acidulation of the fat has been carried out at a temperature of 260° F.

7. The feed supplement of claim 1 wherein the level of acid used for acidulation is about 1–10% by weight of said fat.

8. The feed supplement of claim 1 wherein the acid is a mineral acid.

9. The feed supplement of claim 8 wherein the mineral acid is hydrochloric acid.

10. The feed supplement of claim 1 wherein said acidulated fat has a pH of 4.0–7.0.

11. A feed supplement for ruminants containing an intake limiting composition, said feed supplement comprising grain, said intake limiting composition being present in an amount effective to limit intake of said supplement comprising a mixture of a material selected from the group consisting of meat meal, diammonium phosphate, ammonium sulfate, and combinations thereof and an intake limiting ingredient consisting essentially of an acidulated unsaponified fat selected from the group consisting of coconut oil, corn oil, cottonseed oil, soybean oil, tallow, and grease which has been acidulated at a temperature of at least about 220° F. with an acid.

12. The feed supplement of claim 11 wherein the level of acidulated fat in said mixture is at least about 1.5% by weight of said supplement.

13. The feed supplement of claim 11 wherein the level of meat meal is 0.1–20% by weight of said supplement, the level of ammonium sulfate is between about 0.1–5% by weight of said supplement, and the level of diammonium phosphate is between about 0.1–5% by weight of said supplement.

14. The feed supplement of claim 11 wherein acidulation of the fat has been carried out at a temperature of about 260° F.

15. The feed supplement of claim 11 wherein said acidulated fat has a pH of 4.0–7.0.

16. A method of self-feeding animals by limiting feed supplement intake to a predetermined amount comprising; administering at a level effective to limit intake of said supplement an intake limiting composition consisting essentially of an acidulated unsaponified fat selected from the group consisting of coconut oil, corn oil, cottonseed oil, palm oil, palm kernel oil, soybean oil, tallow, and grease which has been acidulated at a temperature of at least about 220° F. with an acid 17. A method as set forth in claim 16 wherein the amount of said acidulated fat effective to limit intake is at least about 1.5% by weight of said supplement.

18. A method as set forth in claim 16 wherein the amount of said acidulated fat effective to limit intake is between about 1.5 and 16% by weight of said supplement.

19. A method as set forth in claim 16 wherein acidulation has been carried out at a temperature of about 260° F.

20. A method as set forth in claim 16 wherein the acid is a mineral acid.

21. A method as set forth in claim 20 wherein the acid is hydrochloric acid.

22. A method of self-feeding ruminants by limiting feed supplement intake to a predetermined amount comprising; administering at a level effective to limit intake of said supplement an intake limiting composition consisting essentially of a mixture of an acidulated unsaponified fat selected from the group consisting of coconut oil, corn oil, cottonseed oil, palm oil, palm kernel oil, soybean oil, tallow and grease which has been acidulated at a temperature of at least about 220° F. with an acid, and a material selected from the group consisting of meat meal, diammonium phosphate, ammonium sulfate and combinations thereof.

23. A method as set forth in claim 22 wherein the amount of said acidulated fat effective to limit intake is at least about 1.5% by weight of said supplement.

24. A method as set forth in claim 22 wherein the amount of said acidulated fat effective to limit intake is between about 1.5 and 16% by weight of said supplement.

25. A method as set forth in claim 22 wherein acidulation has been carried out at a temperature of about 260° F.

26. A method as set forth in claim 22 wherein the acid is a mineral acid.

27. A method as set forth in claim 26 wherein the acid is hydrochloric acid.

* * * * *